Patented Feb. 7, 1933

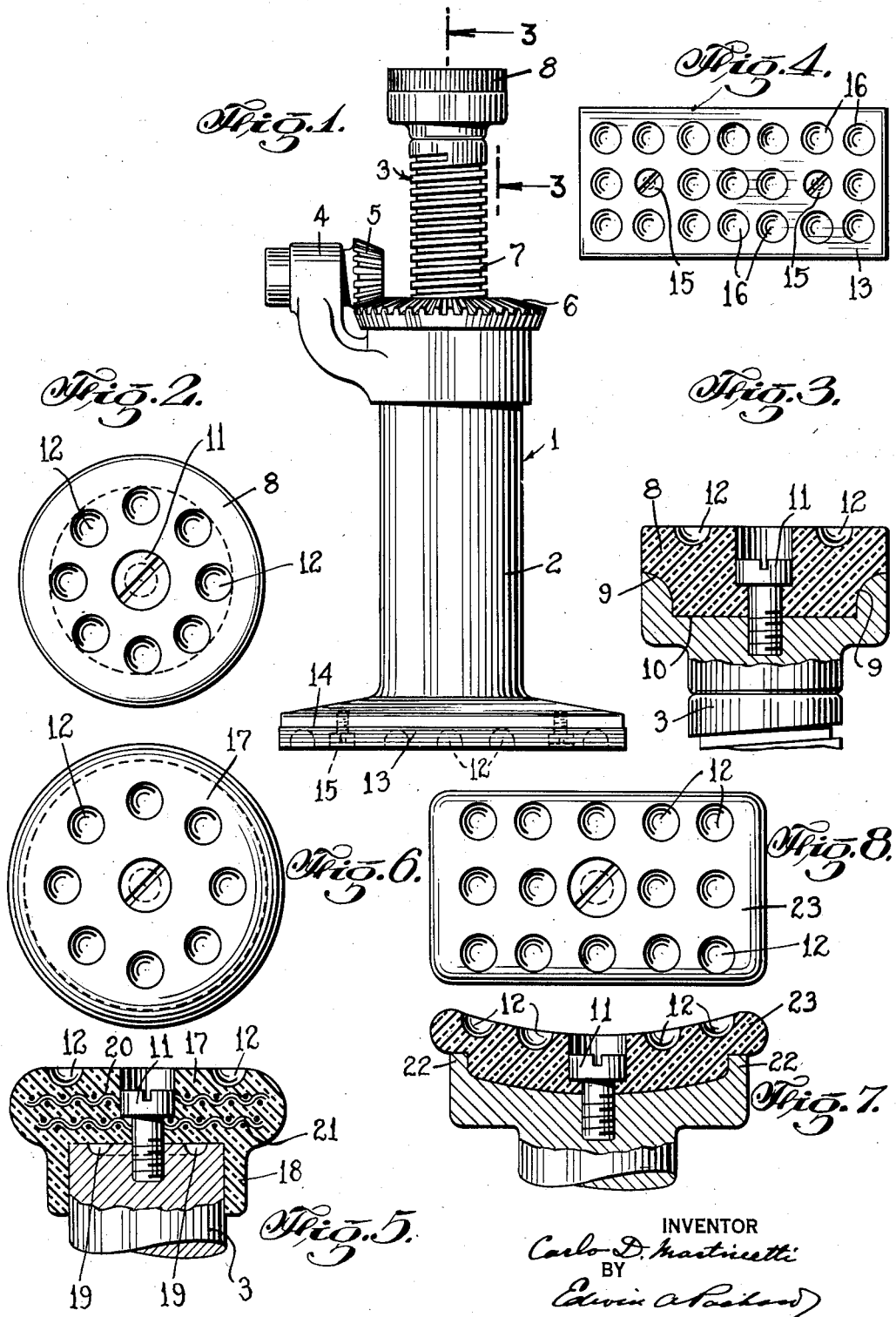

1,896,715

UNITED STATES PATENT OFFICE

CARLO D. MARTINETTI, OF ORANGE, NEW JERSEY

AUTOMOBILE LIFTING JACK

Application filed December 12, 1929. Serial No. 413,564.

The invention particularly relates to lifting jacks especially employed as accessories to automobiles or motive vehicles of all types.

According to the present invention the automobile jack is supplied preferably at both top and bottom with suitable resilient pads having cavities for providing suction cups or vacuum cups for opposing and preventing lateral slippage of the jack from place while it functions to raise and hold in elevated position an automobile member or part.

In some automobile jacks as heretofore constructed the upper member or head and the lower member or base have, one or both, been made of metal corrugated or otherwise roughened to prevent slipping but with such constructions, particularly in wet weather or under icy conditions, they have not functioned as effectively as they should. I am also aware that it has been proposed to provide a jack with a pad at the top so as not to mar the paint or enamel of an automobile member or part engaged by the jack, but such pad was not of a character to prevent lateral slippage particularly in wet weather or under icy conditions.

As previously indicated, according to the present invention when the jack is in use reliance is made for the ensuring of the holding of the jack in place and for the preventing of lateral slippage upon the suction or holding effect of a resilient or elastic pad—preferably of rubber or other suitable yielding material—having cavities on the exposed surfaces thereof for providing a vacuum-cup or suction-cup construction that is essential for realizing the invention. This resilient or elastic pad, which is in effect a yielding pad, is suitably secured or held in place at or on the top of the head or upper member of the jack and in such manner that the pad can also yield under the forces acting upon it as the jack functions and whereby the advantage of the suction effect of the vacuum cups can be attained. Likewise, a resilient or elastic pad is suitably held in place at or against and below the under side of the base or lower member of the jack. As indicated, when an automobile jack is provided with elastic pads having suction-cup cavities therein the result is that the pad yields and conforms to the surface engaged thereby and the effect of the suction-cup construction comes into play to oppose and prevent a lateral slippage of the jack parts relative to the roadway on the one hand and the automobile member or part on the other.

The more specific aspects of the invention contemplate the employment at both the top and bottom of the jack of resilient pads with vacuum-cup cavities therein but it is understood that it is within the broader aspects of the invention to provide a jack with such resilient pad at one end only. Jacks provided with pads having the characteristics referred to function well regardless of the weather conditions; to wit, regardless as to whether the roadway or automobile part engaged by the jack is wet, icy or dry.

As illustrative of certain specific manners in which the invention may be realized reference is made to the drawing forming a part of this specification and in which drawing—

Figure 1 shows in elevation an automobile jack with resilient or elastic pads at the top and bottom and which pads have cavities providing suction-cup or vacuum-cup constructions at the exposed surfaces, to wit, at the top surface of the pad at the top of the jack and at the bottom surface of the pad at the bottom of the jack.

Figures 2 and 3 show, respectively, on somewhat larger scale than in Figure 1 plan and sectional views of the construction at the top of the jack.

Figure 4 is an inverted view showing the bottom of the pad at the bottom of the jack.

Figures 5 and 6 show, respectively, vertical sectional and plan views of another or modified form of construction which can be employed at the top of the jack; and Figures 7 and 8 show, respectively, vertical sectional and plan views or still another or modified form of construction which can be employed at the top of the jack.

Referring to the drawing in detail, the automobile jack is collectively designated as 1. It comprises a base or lower member 2, a head or upper member 3, and means, as 4, for effecting the vertical movement of the lower member 2 relative to the upper member 3. This means 4 comprises a small bevel gear 5 driven in any suitable manner. This gear 5 is in mesh with a larger bevel gear 6, the latter of which rests upon the lower member 2 and is threaded so as to engage the threaded portion 7 of the upper member 3 for the purpose of effecting vertical movement of the latter as the bevel gear 6 rotates. The upper member or head 3 of the jack has at the top thereof a cap or pad 8 suitably secured in place, as by cementing along the surfaces 9 and 10, and further secured in place as by screw 11. This cap or pad 8 is a resilient member preferably of rubber and has small cavities—substantially semi-spherical cavities—designated by 12. It will be noted that the cap or pad 8 is thick enough to yield so that a substantial part, if not all thereof, will conform to the automobile part or member engaged thereby so that the suction effect of the vacuum cups or suction cups can be realized to oppose and prevent lateral displacement of the top or head of the jack. The base of the jack is provided at the bottom thereof with a pad 13 preferably secured in place by cementing along line 14 and further secured as by screws 15. This pad 13 is of suitable yielding material, preferably rubber, and has cavities—preferably semi-spherical cavities—designated by 16 and there is thus provided the suction-cup or vacuum-cup construction on the bottom or exposed under side of the jack. This pad is sufficiently thick to conform—at least a substantial portion thereof—to the roadway or other material upon which the jack rests or is supported whereby the suction effect of the cup construction can be realized to oppose and prevent lateral displacement of the base of the jack.

The pad or cap shown in Figures 5 and 6 function similarly to that of Figures 2 and 3, but according to Figure 5 it will be noted that the pad or cap 17 has a depending flange portion 18 to help hold it in place and the upper member of the jack is also grooved at 19 so as to oppose undue spreading of the cap on the metal at the top of the jack. Also, in order to oppose undue spreading where the loads on the jack are relatively heavy there is provided suitable reinforcing fabric, as at 20 and 21. In the construction of Figures 7 and 8 the metal on the upper member of the jack has a flange portion, as at 22, which tends to retain a resilient pad 23 in place and also prevent undue spreading. The resilient pad of Figures 7 and 8 has an upper surface of somewhat different shape than that shown in the other figures mentioned. In all of the pads illustrated, however, a suitable yielding material is employed, preferably rubber, and the pads are all suitably held in place relative to the jack member to which it is applied.

Each of the pads shown has cavities, as 12 or 16, and each pad functions as heretofore described, and from the drawing it will be readily seen each pad is constructed and arranged with respect to that part of the jack to which it is secured so that all of the load which at any one time is lifted by and carried through the jack is transmitted and carried entirely, or at least substantially entirely, (a) to and through the upper resilient pad to and through the upper metal portion of the head or upper member 3 of the jack; and (b) ultimately to and through the lower metal portion of the base or lower member 2 of the jack to and through the lower resilient pad 13 to the roadway or other material or foundation upon which the jack is placed or supported. In fact, it will be noted that the resilient pads each has a jack-engaging surface which is at least as large or extensive as the surface of the member or part of the jack to which the pad is secured.

It will be noted that in applicant's jack, as in automobile jacks used prior to his invention, the head or upper member 3 is small as compared with the base or lower member 2 which has a comparatively large and relatively flat bearing surface that is relied upon to hold the jack in upright position while the jack is functioning. Applicant's invention, in its more specific form, resides in supplying (a) the small head or upper member with a resilient cap as particularly described for preventing slipping as between the jack head and the automobile part lifted thereby, and (b) the large base member with a resilient pad as particularly described which is relied upon for preventing the lateral shifting of the base member relative to the ground while at the same time transmitting the loads downwardly therethrough to a sufficiently large space on the supporting ground whereby the jack and its load will be properly maintained in upright position while functioning It will be manifest that the several pads can be made of different forms and shapes and may be made of different materials and still be within the purview and spirit of the invention.

What I claim is:

1. An automobile jack having a base or lower member, a vertically movable head or upper member, and suitably associated means whereby the vertical lifting movement of the upper member relative to the lower member can be effected, said head or upper member being small as compared with the base or lower member which has a relatively flat supporting surface and which is sufficiently large to support and to maintain the jack in upright position while functioning to lift and support its load, said jack being characterized in that the top of the upper member and the bottom of the lower member is each provided with a suitable rubber pad with vacuum cups on the exposed surface thereof whereby as the jack functions in the lifting of an automobile part the suction of the vacuum cups become effective to prevent slipping as between the bottom of the jack and the roadway on the one hand and the top of the jack and the automobile part engaged thereby on the other hand, each said pad being constructed and arranged with respect to the part of the jack to which it is secured so that all of the load which at one time is lifted and carried through the jack is transmitted at least substantially entirely to and through each said pad.

2. An automobile jack comprising a base member, a movable upper member, and associated with said members means by which upward lifting movement is imparted to said upper member relative to said base member, said base member having a supporting surface, large as compared with the upper supporting surface of the upper member, whereby the jack is supported and maintained in upright position while functioning to lift and hold the load thereon, said base member having secured to the underside a resilient pad with vacuum cups on the under surface of said pad and the upper member having secured to the top thereof a resilient pad with vacuum cups on the upper surface of said last mentioned pad, which pads are constructed to conform to a surface engaged thereby whereby the suction of the vacuum cups can be effective in opposing any tendency of the base of the jack to slip relative to its support and of the top of the jack to slip relative to the automobile member engaged thereby as the jack functions to lift and hold in elevated position said automobile member, each said pad being constructed and arranged with respect to the part of the jack to which it is secured so that all of the load which at one time is lifted and carried through the jack is transmitted at least substantially entirely to and through each said pad.

3. An automobile jack having a base or lower member, a vertically movable head or upper member, and suitably associated means whereby the vertical lifting movement of the upper member relative to the lower member can be effected, said head or upper member being small as compared with the base or lower member which has a relatively flat supporting surface and which is sufficiently large to support and to maintain the jack in upright position while functioning to lift and support its load, said jack being characterized in that the top of the upper member is provided with a suitable resilient pad with vacuum cups on the top surface thereof whereby as the jack functions in the lifting of an automobile part the suction of the vacuum cups become effective to prevent slipping as between the top of the jack and the automobile part engaged thereby, and which resilient pad is constructed and arranged so that all of the load transmitted to and through the jack is at least substantially entirely transmitted to and through said pad.

4. An automobile jack having a base or lower member, a vertically movable head or upper member, and suitably associated means whereby the vertical lifting movement of the upper member relative to the lower member can be effected, said head or upper member being small as compared with the base or lower member which has a relatively flat supporting surface and which is sufficiently large to support and to maintain the jack in upright position while functioning to lift and support its load, said jack being characterized in that the bottom of the lower member is provided with a suitable resilient pad with vacuum cups on the under surfaces thereof whereby as the jack functions in the lifting of an automobile part the suction of the vacuum cups become effective to prevent slipping as between the bottom of the jack and the roadway, and which resilient pad is constructed and arranged so that all of the load transmitted to and through the jack is at least substantially entirely transmitted to and through said pad.

5. An automobile jack construction according to claim 3 in which the resilient pad is provided with reinforcing fabric arranged to oppose undue spreading of the pad when the jack is in use.

6. An automobile jack construction according to claim 3 in which the upper member of the jack has an upright flange portion which tends to retain the pad in place and also to prevent undue spreading.

In testimony whereof I have hereunto signed my name.

CARLO D. MARTINETTI.